United States Patent
Hayashi

(10) Patent No.: US 11,178,309 B2
(45) Date of Patent: Nov. 16, 2021

(54) IMAGE PROCESSING APPARATUS, IMAGE PROCESSING METHOD, AND NON-TRANSITORY RECORDING MEDIUM STORING IMAGE PROCESSING PROGRAM

(71) Applicant: SEIKO EPSON CORPORATION, Tokyo (JP)

(72) Inventor: Ryotaro Hayashi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/891,611

(22) Filed: Jun. 3, 2020

(65) Prior Publication Data

US 2020/0389570 A1    Dec. 10, 2020

(30) Foreign Application Priority Data

Jun. 5, 2019 (JP) .............................. JP2019-105069

(51) Int. Cl.
*H04N 1/60* (2006.01)

(52) U.S. Cl.
CPC ......... *H04N 1/6008* (2013.01); *H04N 1/6097* (2013.01)

(58) Field of Classification Search
CPC .. H04N 1/6008; H04N 1/6097; H04N 1/6033; H04N 1/6055
See application file for complete search history.

(56) References Cited

U.S. PATENT DOCUMENTS

| | | | | |
|---|---|---|---|---|
| 7,027,182 B1* | 4/2006 | Soler | .................... | H04N 1/6022 347/19 |
| 8,681,375 B2* | 3/2014 | Katayama | ............ | H04N 1/6055 358/1.9 |
| 2002/0149799 A1* | 10/2002 | Hayashi | ............. | H04N 1/32502 358/406 |
| 2002/0158933 A1* | 10/2002 | Yamamoto | ............... | H04N 1/52 347/15 |
| 2003/0007164 A1* | 1/2003 | Lee | ....... | H04N 1/6097 358/1.9 |
| 2004/0184658 A1* | 9/2004 | Inoue | .................... | H04N 1/6055 382/162 |
| 2005/0270321 A1* | 12/2005 | Ono | ..................... | H04N 1/6033 347/14 |

(Continued)

FOREIGN PATENT DOCUMENTS

JP   2013-102364         5/2013
JP   2013102364 A    *  5/2013

*Primary Examiner* — Ted W Barnes
(74) *Attorney, Agent, or Firm* — Workman Nydegger

(57) ABSTRACT

An image processing apparatus for causing a printer to perform printing includes: a memory storing a color profile including a plurality of corresponding relationships between color values being coordinate values in a color space and recording material values corresponding to respective amounts of recording materials used; and a processor configured to cause the printer to print a color chart. The processor obtains a plurality of specific recording material values being the recording material values corresponding to specific color values being coordinate values of the color space in accordance with the plurality of corresponding relationships included in the color profile, and causes the printer to print the color chart including patches having the corresponding amounts of the individual specific recording material values used.

8 Claims, 10 Drawing Sheets

(56) References Cited

U.S. PATENT DOCUMENTS

| | | | | |
|---|---|---|---|---|
| 2006/0227397 A1* | 10/2006 | Goma | ............... | H04N 1/6033 358/521 |
| 2009/0290180 A1* | 11/2009 | Onoda | ............... | H04N 1/46 358/1.9 |
| 2010/0157337 A1* | 6/2010 | Akado | ............... | H04N 1/6033 358/1.9 |
| 2011/0075173 A1* | 3/2011 | Katayama | ............... | H04N 1/6097 358/1.9 |
| 2011/0292477 A1* | 12/2011 | Klassen | ............... | H04N 1/6033 358/505 |
| 2012/0133960 A1* | 5/2012 | Henderson | ............... | H04N 1/6033 358/1.9 |
| 2012/0133961 A1* | 5/2012 | Henderson | ............... | G06K 15/027 358/1.9 |
| 2013/0135683 A1* | 5/2013 | Sawada | ............... | H04N 1/6025 358/2.1 |
| 2013/0322750 A1* | 12/2013 | Agarwal | ............... | G06K 9/4652 382/165 |
| 2016/0352972 A1* | 12/2016 | Kobayashi | ............... | H04N 1/648 |
| 2018/0167535 A1* | 6/2018 | Widener | ............... | H04N 1/6033 |
| 2018/0376032 A1* | 12/2018 | Tanaka | ............... | H04N 1/6075 |
| 2019/0199875 A1* | 6/2019 | Komatsu | ............... | H04N 1/6075 |
| 2019/0301941 A1* | 10/2019 | Kawabata | ............... | G01J 3/524 |
| 2020/0364015 A1* | 11/2020 | Katsuzawa | ............... | G06F 3/1208 |

\* cited by examiner

FIG. 4

| | CO | CO | | CO | | CO |
|---|---|---|---|---|---|---|
| Lab0 | CMYKFy1 | CMYKFy2 | ...... | CMYKFyi | ...... | CMYKFyn |
| Lab01 | CMYKFy11 | CMYKFy21 | ...... | CMYKFyi1 | ...... | CMYKFyn1 |
| Lab02 | CMYKFy12 | CMYKFy22 | ...... | CMYKFyi2 | ...... | CMYKFyn2 |
| ⋮ | ⋮ | ⋮ | | ⋮ | | ⋮ |
| Lab0j | CMYKFy1j | CMYKFy2j | ...... | CMYKFyij | ...... | CMYKFynj |
| ⋮ | ⋮ | ⋮ | | ⋮ | | ⋮ |
| Lab0m | CMYKFy1m | CMYKFy2m | ...... | CMYKFyim | ...... | CMYKFynm |

| | |
|---|---|
| (L0, a0, b0) | (Ci, Mi, Yi, Ki, Fyi) |
| (L01, a01, b01) | (Ci1, Mi1, Yi1, Ki1, Fyi1) |
| (L02, a02, b02) | (Ci2, Mi2, Yi2, Ki2, Fyi2) |
| ⋮ | ⋮ |
| (L0j, a0j, b0j) | (Cij, Mij, Yij, Kij, Fyij) |
| ⋮ | ⋮ |
| (L0m, a0m, b0m) | (Cim, Mim, Yim, Kim, Fyim) |

IMAGE PROCESSING APPARATUS, IMAGE PROCESSING METHOD, AND NON-TRANSITORY RECORDING MEDIUM STORING IMAGE PROCESSING PROGRAM

The present application is based on, and claims priority from JP Application Serial Number 2019-105069, filed Jun. 5, 2019, the disclosure of which is hereby incorporated by reference herein in its entirety.

BACKGROUND

1. Technical Field

The present disclosure relates to an image processing apparatus, an image processing method, and a non-transitory recording medium storing an image processing program.

2. Related Art

In the image forming apparatus disclosed in JP-A-2013-102364, as a basic mode, individual patches are arranged such that the differences in color information have predetermined intervals in a predetermined direction in accordance with a reference patch filled with a reference color as a start point, and the image forming apparatus prints a color adjustment chart in which a plurality of patches are arranged. The image forming apparatus changes the basic mode in accordance with the graininess index or the color difference of the individual patches arranged in a predetermined direction and prints a color adjustment chart in the changed mode.

When using a color adjustment chart in which each patch is based on a different color value, a user is able to select a hue due to the difference in color value. However, even when the patches are based on the same color value, when ink content differs in individual patches, the color characteristics of the patches are also different. For example, when a fluorescent color ink is included in a plurality of kinds of ink in patches based on the same color value, when the ink content of a fluorescent color differs in each patch, each patch emits fluorescence in a correspondingly different manner. Also, when cyan ink, magenta ink, yellow ink, and black ink are used, even when the patches are based on the same color value, when black ink content differs for individual patches, the graininess of dots due to the black ink differs. With the technique described above, it is not possible to confirm the difference in color characteristics when the individual patches are based on the same color value.

SUMMARY

According to an aspect of the present disclosure, there is provided an image processing apparatus for causing a printer to perform printing, the image processing apparatus including: a memory storing a color profile including a plurality of corresponding relationships between color values being coordinate values in a color space and recording material values corresponding to respective amounts of recording materials used; and a processor configured to cause the printer to print a color chart, wherein the processor obtains a plurality of specific recording material values being the recording material values corresponding to specific color values being coordinate values in the color space in accordance with the plurality of corresponding relationships included in the color profile, and causes the printer to print the color chart including patches having the corresponding amounts of the individual specific recording material values used.

Also, according to another aspect of the present disclosure, there is provided an image processing method for causing a printer to perform printing, the image processing method including: in accordance with the plurality of corresponding relationships included in the color profile including a plurality of corresponding relationships between color values being coordinate values in a color space and recording material values corresponding to respective amounts of recording materials used, an obtaining step of obtaining a plurality of specific recording material values being the recording material values corresponding to specific color values being coordinate values in the color space; and a controlling step of causing the printer to print a color chart including patches having the corresponding amounts of the individual specific recording material values used.

Further, according to another aspect of the present disclosure, there is provided a non-transitory recording medium storing an image processing program for causing a printer to perform printing, the image processing program causing a computer to perform functions including: by using a color profile including a plurality of corresponding relationships between color values being coordinate values in a color space and recording material values corresponding to respective amounts of recording materials used in accordance with the plurality of corresponding relationships included in the color profile, an obtaining function of obtaining a plurality of specific recording material values being the recording material values corresponding to specific color values being coordinate values in the color space; and a controlling function of causing the printer to print a color chart including patches having the corresponding amounts of the individual specific recording material values used.

BRIEF DESCRIPTION OF THE DRAWINGS

FIG. 4 is a diagram schematically illustrating an example of the structure of a color conversion table included in a color profile.

DESCRIPTION OF EXEMPLARY EMBODIMENTS

In the following, a description will be given of embodiments of the present disclosure. The following embodiments are only examples of the present disclosure, and not all characteristics described in the embodiments are necessarily required to realize the means of the disclosure.

1. Overview of Technology Included in the Present Disclosure

First, an overview will be given of technology included in the present disclosure with reference to the examples illustrated in FIGS. 1 to 10. In this regard, the diagrams in the application concerned are diagrams schematically illustrating examples. The magnification ratio in each direction illustrated in these diagrams sometimes differs, and diagrams are sometimes inconsistent. Each component in the present technology is not limited to a specific example denoted by a reference. In "Overview of Technology included in the Present Disclosure", words in parentheses provide a supplementary explanation of the immediately preceding words.

Mode 1

Figure 1:
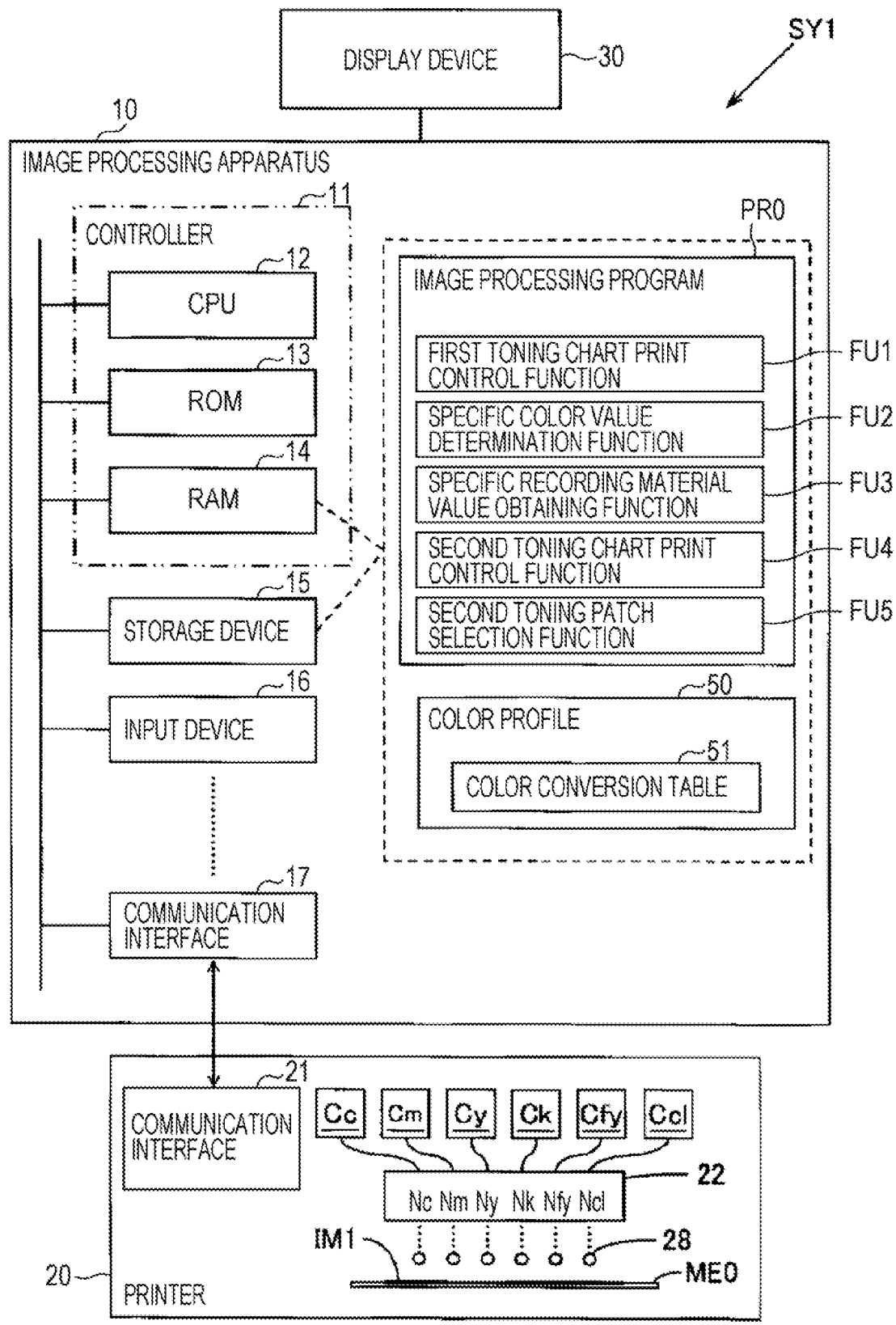
FIG. 1 is a block diagram schematically illustrating an example of the configuration of an image processing system.

As illustrated in FIG. 1, an image processing apparatus 10 according to one mode of the present technique includes memory (for example, a storage device 15) and a processor (for example, a controller 11). As illustrated in FIGS. 1 and 4, the memory (15) stores a color profile 50 including a plurality of corresponding relationships CO between color values (for example, $Lab0j$ illustrated in FIG. 4), which are coordinate values in a color space, and recording material values (for example, $CMYKFyij$ illustrated in FIG. 4) corresponding to respective amounts of recording materials. The processor (11) obtains a plurality of specific recording material values (for example, $Ci$, $Mi$, $Yi$, $Ki$, and $Fyi$ illustrated in FIG. 5), which are the recording material values corresponding to specific color values (for example, $L0$, $a0$, and $b0$ illustrated in FIG. 5) that are coordinate values in the color space in accordance with the plurality of corresponding relationships CO included in the color profile 50, and causes a printer (for example, the printer 20 illustrated in FIG. 1) to print a color chart (for example, a second tone chart CH2 illustrated in FIG. 3) including patches of the used amounts that correspond to the individual specific recording material values.

The color chart (CH2) that includes patches of the used amounts of the recording materials that correspond to the plurality of individual specific recording material values while being based on the same specific color value is printed, and thus it is possible for a user to confirm different color characteristics of colors while the colors are based on the same color value. Accordingly, in this mode, it is possible to provide an image processing apparatus that enables the user to select a color having desired color characteristics when the color characteristics differ in accordance with the amounts of recording materials used when individual colors are based on the same color value.

Here, for a color space, a device independent color space is desirable, but a device dependent color space may be used. Device independent color spaces include the CIE (International Commission on Illumination) L*a*b* color space, the CIEXYZ color space, and the like. Color values include L*a*b* values, which are coordinate values in the L*a*b*color space, XYZ values, which are coordinate values in the XYZ color space, and the like. In the following, description of "*" is omitted. Recording material values include various values, such as values identified in modes 2 to 4 described later. In this regard, the additional remarks above also apply to the following modes.

Mode 2

Figure 3:
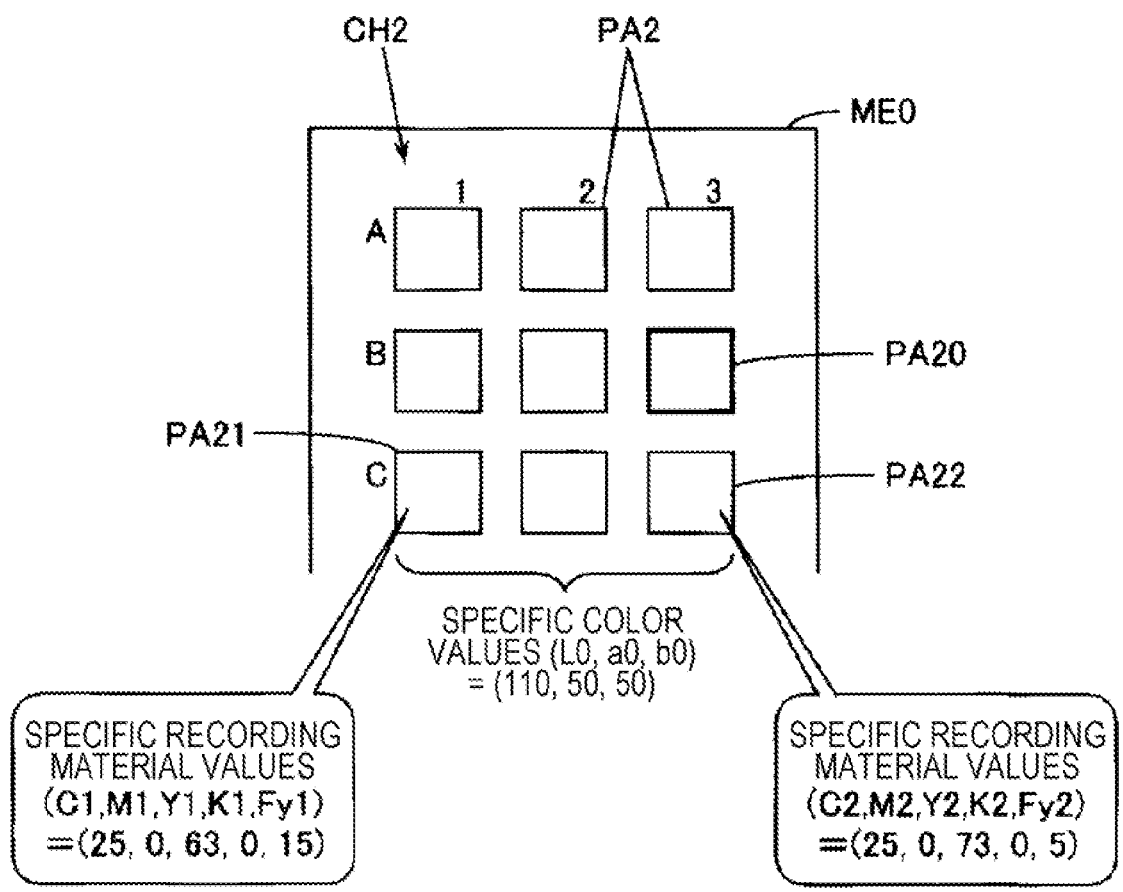
FIG. 3 is a diagram schematically illustrating an example of a printed matter of a second toning chart.

The recording material values may include values corresponding to respective amounts of cyan (C), magenta (M), yellow (Y), black (K), and fluorescent color (for example, Fy) used. As illustrated in FIG. 3, the color chart (CH2) may include a patch (for example, a patch PA21) in which the amount of the fluorescent color used is a first amount of fluorescent color (for example, the amount corresponding to Fy1), and a patch (for example, a patch PA22) in which the amount of the fluorescent color used is a second amount of fluorescent color (for example, the amount corresponding to Fy2), which is different from the first amount of fluorescent color. In this mode, it becomes possible to select a color having desired fluorescence characteristics from a plurality of colors having different fluorescence characteristics in accordance with the amount of the recording material of fluorescent color used even when the colors are based on the same color value. Here, in the present disclosure, "first", "second", "third", and the like are terms for identifying respective components and do not infer order. The additional remarks above also apply to the following modes.

Mode 3

Figure 8:
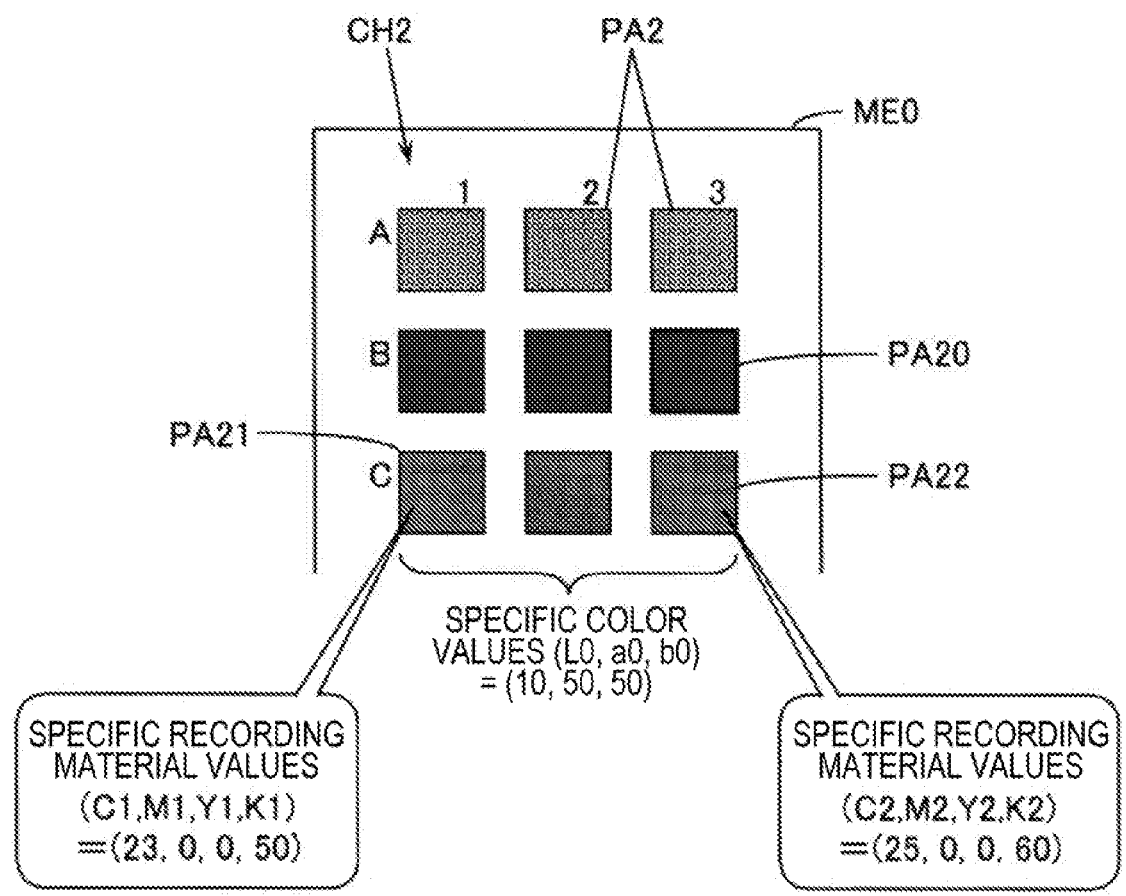
FIG. 8 is a diagram schematically illustrating another example of a printed matter of a second toning chart.

The recording material values may include values corresponding to respective amounts of cyan (C), magenta (M), yellow (Y), and black (K) used. As illustrated in FIG. 8, the color chart may include a patch (for example, patch PA21) in which the amount of black used is a first amount of black (for example, the amount corresponding to K1) and a patch (for example, patch PA22) in which the amount of black used is a second black amount (for example, the amount corresponding to K2) different from the first amount of black. In this mode, it becomes possible to select a color having a desired graininess from a plurality of colors having different graininess values in accordance with the amount of black recording material used even when the colors are based on the same color value.

Mode 4

Figure 9:
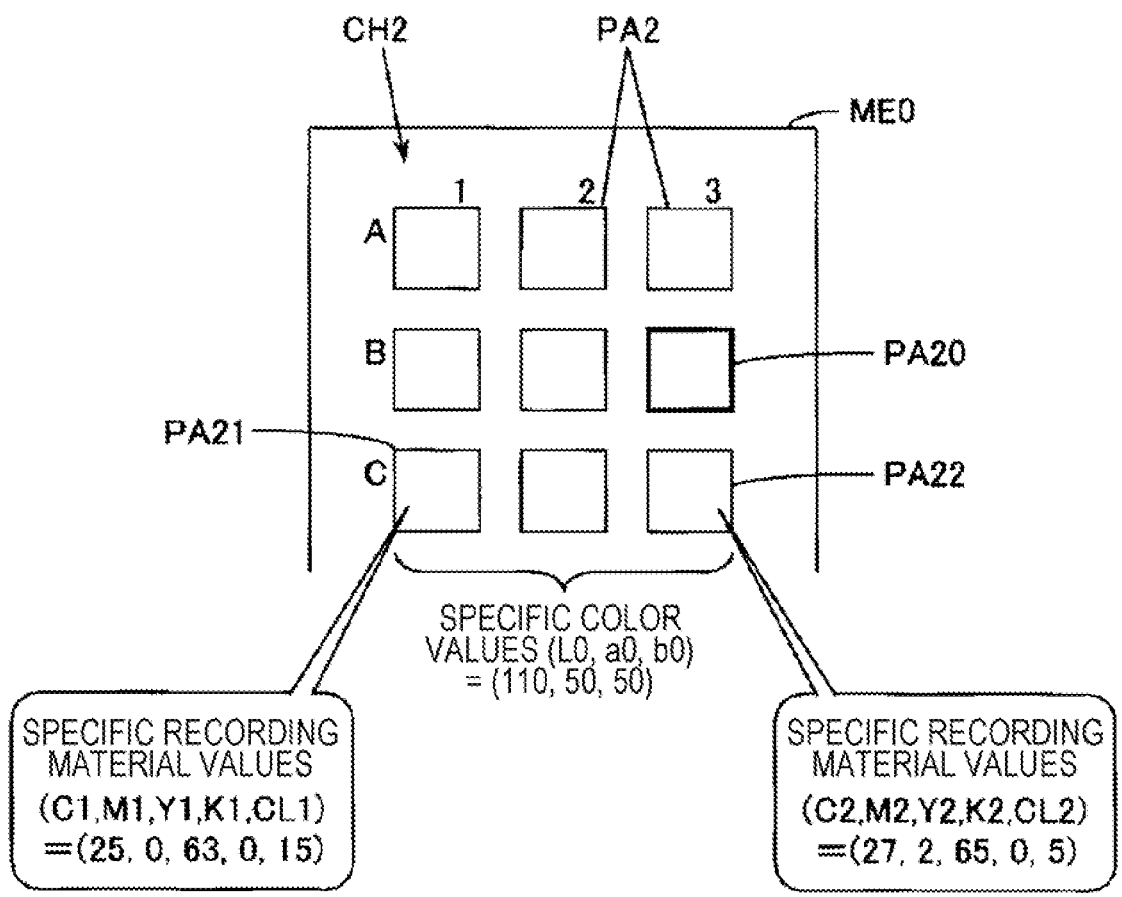
FIG. 9 is a diagram schematically illustrating another example of a printed matter of a second toning chart.

The recording material values may include values corresponding to the respective amounts of cyan (C), magenta (M), yellow (Y), black (K), and clear (CL) used. As illustrated in FIG. 9, the color chart may include a patch (for example, the patch PA21) in which the amount of the clear used is a first clear amount (for example, the amount corresponding to CL1) and a patch (for example, the patch PA22) in which the amount of the clear used is a second clear amount (for example, the amount corresponding to CL2) different from the first clear amount. In this mode, it becomes possible to select a color having a desired surface effect from a plurality of colors having different surface effects in accordance with the amounts of clear recording material used even when the colors are based on the same color value.

Mode 5

Figure 2:
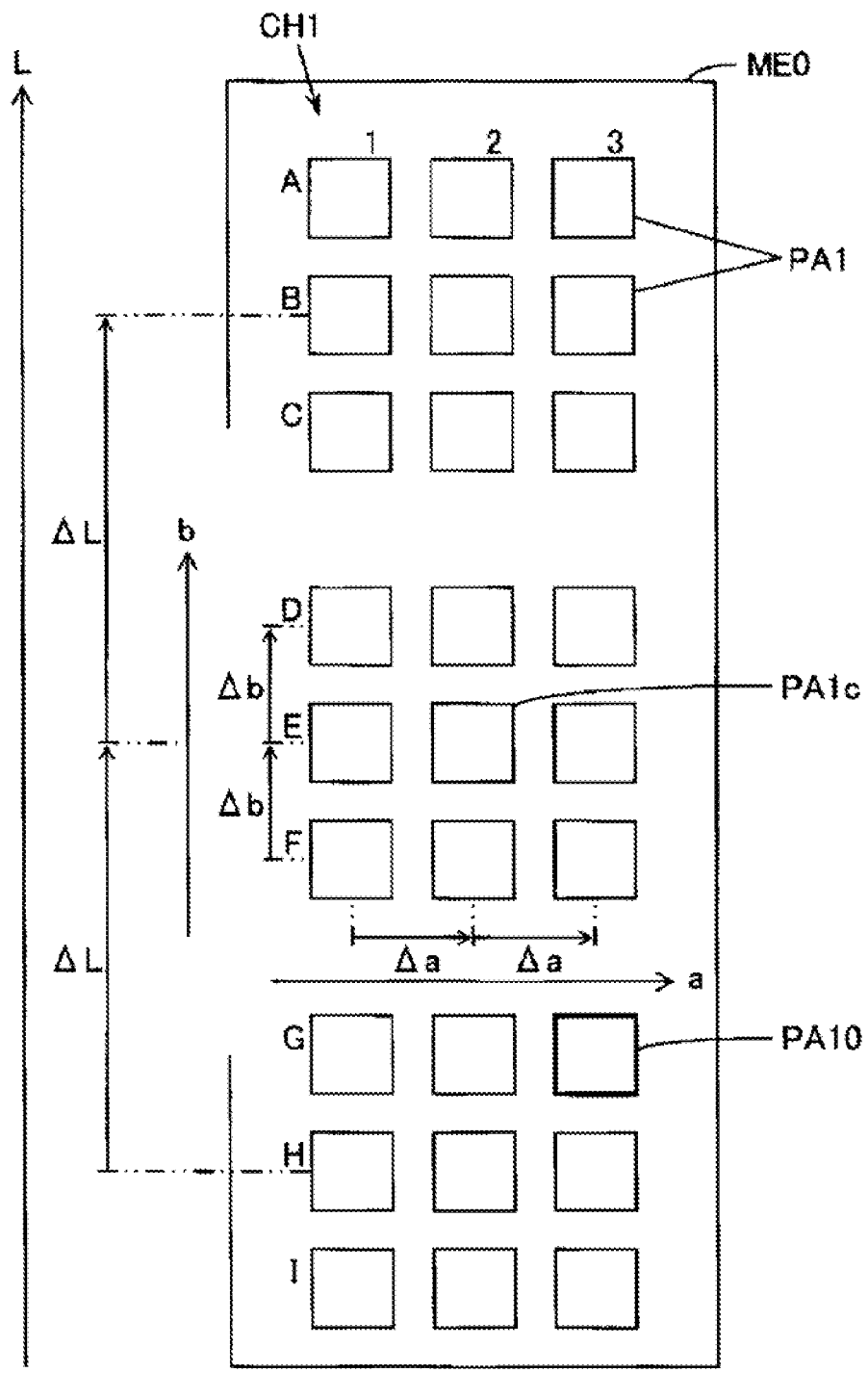
FIG. 2 is a diagram schematically illustrating an example of a printed matter of a first toning chart.
Figure 5:
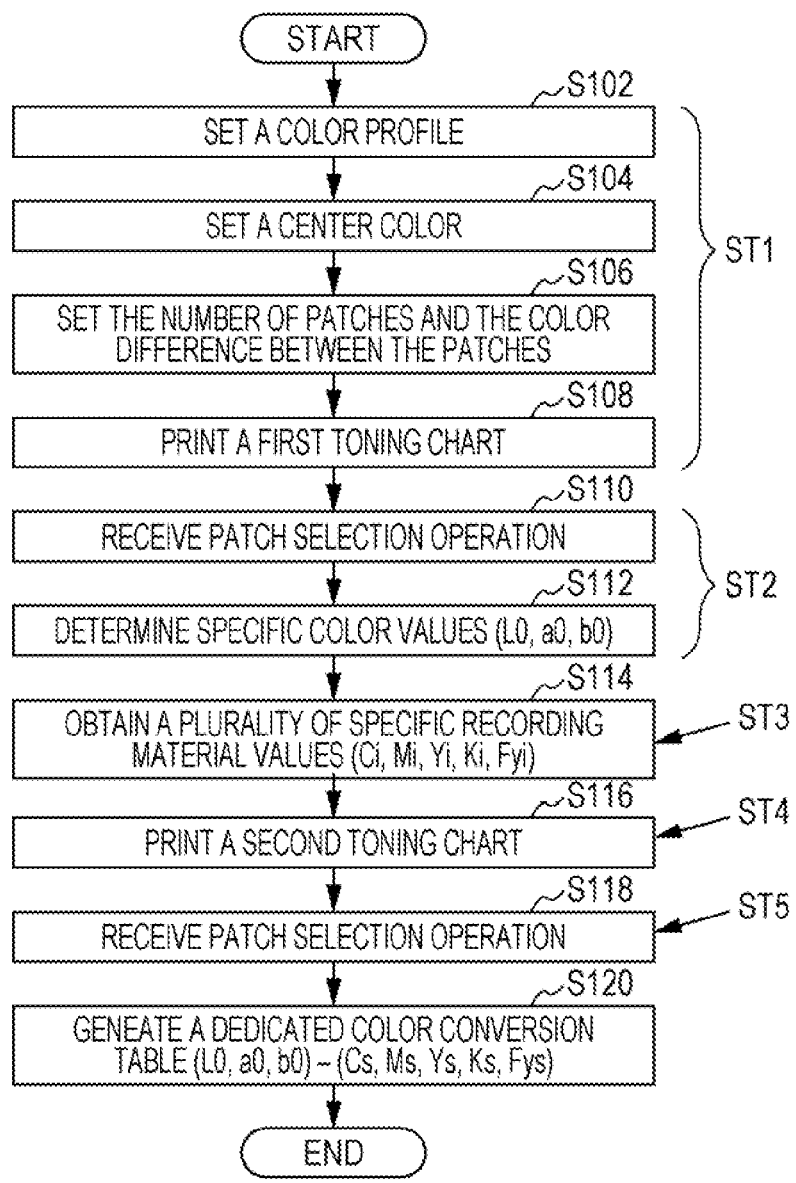
FIG. 5 is a flowchart illustrating an example of color setting processing performed by an image processing apparatus.

As illustrated in FIGS. 2 and 3, the color chart may include a first tone chart CH1 including a plurality of first tone patches PA1 as the plurality of patches and a second tone chart CH2 including a plurality of second tone patches PA2 as the plurality of patches. As illustrated in FIG. 5, the processor (11) may perform the following processing. First processing for causing the printer (20) to print the first tone chart CH1 including the plurality of first tone patches PA1 each based on different color values. Second processing for determining the specific color values in accordance with selection of the first tone patch PA1 in the first tone chart CH1. Third processing for obtaining the plurality of specific recording material values corresponding to the specific color values in accordance with the plurality of corresponding relationships CO. Fourth processing for causing the printer (20) to print the second tone chart CH2 including the second tone patches PA2 of the used amounts corresponding to the individual specific recording material values. Fifth processing for receiving selection of the second tone patches PA2 included in the second tone chart CH2.

In mode 5, it is possible to select a second tone patch PA2 after determining the specific color value that becomes a reference at the time of selecting the color characteristics, and thus it is possible to improve convenience.

Mode 6

Figure 10:
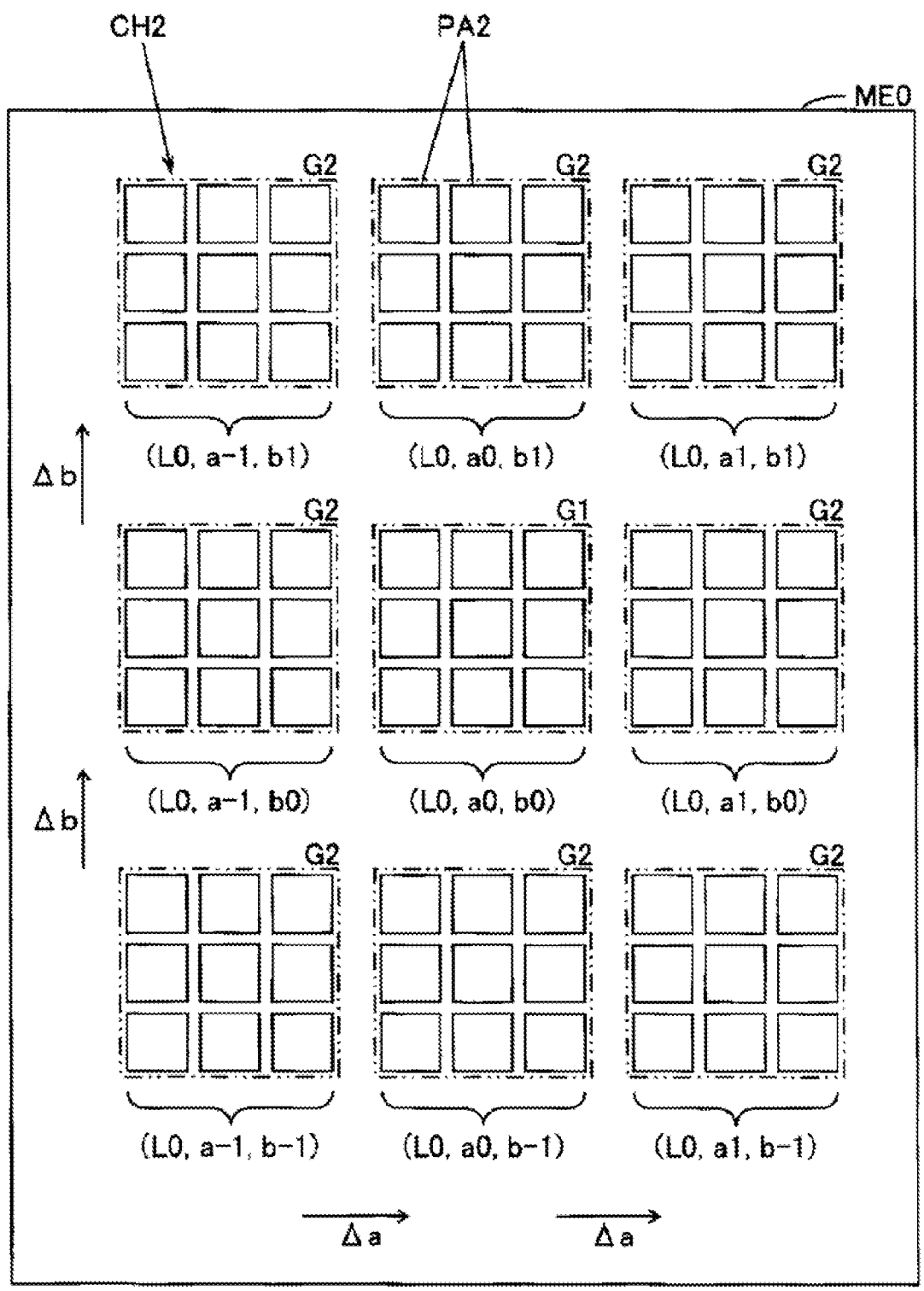
FIG. 10 is a diagram schematically illustrating another example of a printed matter of a second toning chart.

As illustrated in FIG. 10, the processor (11) may cause the printer (20) to print the color chart that includes a first patch group G1 including the patches of the used amounts corresponding to the individual specific recording material values (for example, Ci, Mi, Yi, Ki, and Fyi illustrated in FIG. 5) corresponding to the specific color values (for example, L0, a0, and b0) and a second patch group P2 including the patches of the used amounts corresponding to the individual specific recording material values corresponding to the peripheral color values that have a predetermined color difference from the specific color values. In this mode, it becomes possible to select a color by giving higher priority to the color characteristics than the specific color value that becomes a reference.

Mode 7

Incidentally, as illustrated in FIG. 5, an image processing method according to one mode of the present technique is an image processing method that causes the printer (20) to perform printing and includes an obtaining step (for example, a third step ST3) and a controlling step (for example, a fourth step ST4). In the obtaining step (ST3), the image processing method obtains a plurality of specific recording material values that are coordinate values in the color space in accordance with the plurality of corresponding relationships CO included in a color profile 50 including a plurality of corresponding relationships CO between color values, which are coordinate values in a color space, and recording material values corresponding to the amounts of recording materials used. In the controlling step (ST4), the image processing method causes the printer (20) to print a color chart including patches of the used amounts corresponding to the individual specific recording material values.

A color chart including patches of the used amounts of the recording material corresponding to a plurality of the individual different specific recording material values based on the same specific color value is printed. Accordingly, it is possible for the user to confirm different color characteristics when having the same color value. Accordingly, in this mode, it is possible to provide an image processing method that enables the user to select a color having desired color characteristics when the color characteristics differ in accordance with the amount of a recording material used when colors are based on the same color value.

Mode 8

Figure 7:
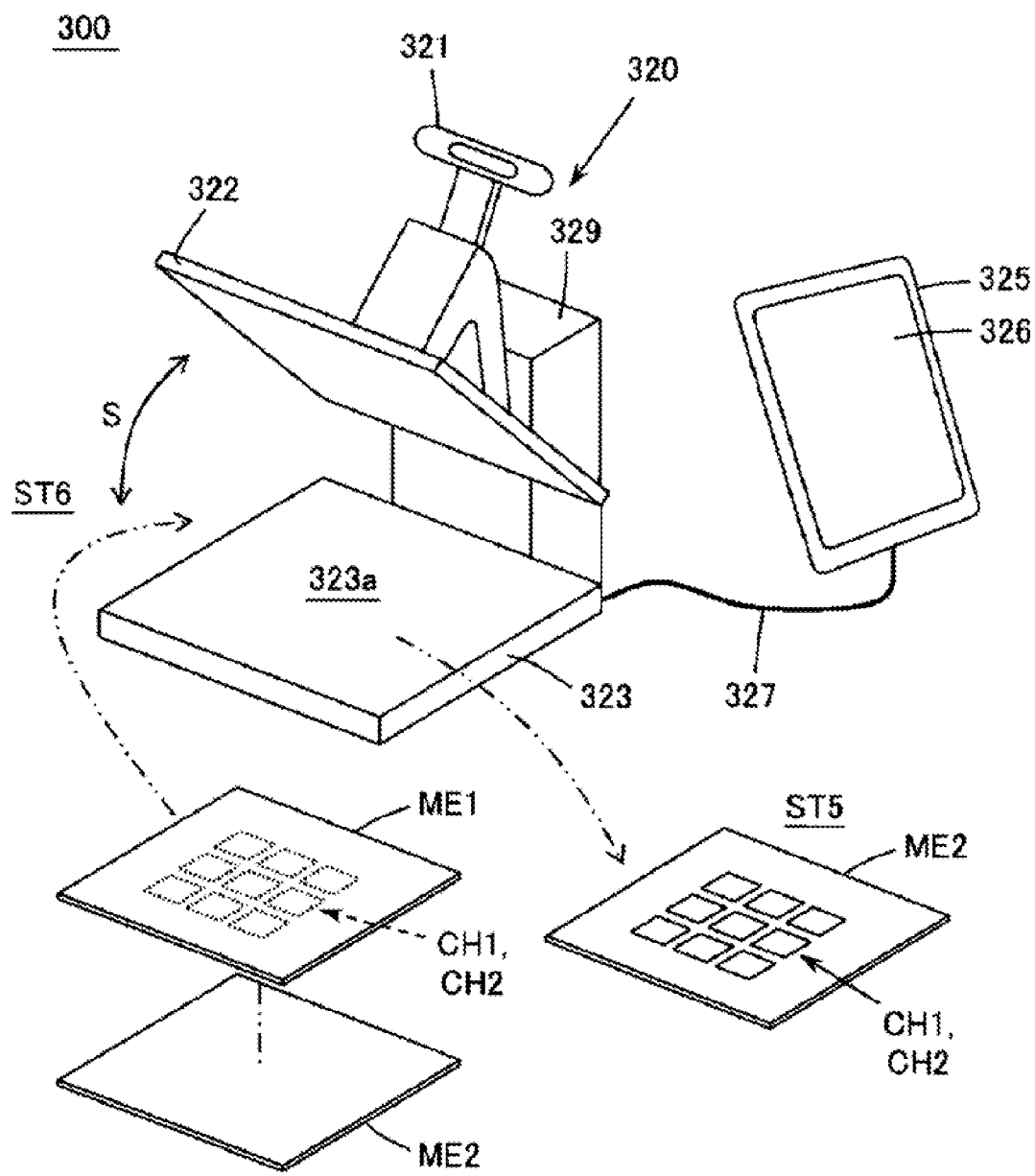
FIG. 7 is a diagram schematically illustrating an example of a transfer apparatus.

The printer (20) may print the color chart on a first medium (for example, thermal transfer paper ME1). As illustrated in FIG. 7, the image processing method may further include a transfer step ST6 of transferring the color chart printed on the first medium (ME1) onto a second medium (for example, cloth ME2) and a receiving step (ST5) of receiving a selection operation of the patch included in the color chart transferred onto the second medium (ME2). In this mode, when using a transfer type printer, it is possible to provide a suitable method of selecting a color having desired color characteristics when the color characteristics differ in accordance with the amount of a recording material when the colors are based on the same color value.

Mode 9

Also, as illustrated in FIG. 1, an image processing program PRO according to one mode of the present technique causes a computer (for example, the image processing apparatus 10) to realize an obtaining function (for example, a specific recording material value obtaining function FU3) corresponding to the obtaining step (ST3) and a controlling function (for example, a second toning chart print controlling function FU4) corresponding to the controlling step (ST4). In this mode, it is possible to provide an image processing program that enables the user to select a color having desired color characteristics when the color characteristics differ in accordance with the amount of a recording material used when the colors are based on the same color value.

Further, it is possible to apply the present technique to an image processing system including an image processing apparatus, a control method of an image processing system, a program of an image processing system, a computer-readable medium for storing any one of the programs described above, and the like. The image processing apparatus and the image processing system may be constituted by a plurality of separate parts.

2. Example of Image Processing Apparatus

FIG. 1 schematically illustrates an example of an image processing system SY1 including an image processing apparatus 10. The image processing system SY1 illustrated in FIG. 1 includes the image processing apparatus 10, a printer 20, which is an example of a printer, and a display device 30.

The image processing apparatus 10 illustrated in FIG. 1 includes, as an electronic subsystem, a CPU 12, which is a processor, a ROM 13, which is a semiconductor memory, a RAM 14, which is a semiconductor memory, the storage device 15, which is an example of the memory, an input device 16, and a communication interface 17. Here, CPU is an abbreviation of "central processing unit", ROM is an abbreviation of "read-only memory", RAM is an abbreviation of "random access memory", and I/F illustrated in FIG. 1 is an abbreviation of "interface". The image processing program PRO that causes a computer to function as the image processing apparatus 10 is stored in the storage device 15, is loaded into the RAM 14 by the CPU 12, and is executed by the CPU 12. A plurality of functions realized by the image processing apparatus 10 running the image processing program PRO include a first toning chart print controlling function FU1, a specific color value determination function FU2, a specific recording material value obtaining function FU3, a second toning chart print controlling function FU4, and a second toning patch selection function FU5. The CPU 12 executes the image processing program PRO while using the RAM 14 as a work area so as to cause the image processing apparatus 10 to perform the functions FU1 to FU5 and the like to perform various kinds of processing. The above-described components 12 to 15 are examples of the controller 11. The processor constituting the controller 11 is not limed to being a single CPU and may be a plurality of CPUs, a hardware circuit such as an ASIC, a combination of a CPU and a hardware circuit, or the like. Here, ASIC is an abbreviation of "application specific integrated circuit".

The storage device 15 stores, in addition to the image processing program PRO, a color profile 50 to be used for printing toning charts CH1 and CH2 illustrated in FIGS. 2 and 3. The color profile 50 includes coordinate values in a Lab color space, recording material values corresponding to used ink amounts, and a color conversion table 51 representing corresponding relationships. It is possible for the color profile 50 to have, for example, the data format of an ICC profile. Here, ICC is an abbreviation of "International Color Consortium". It is possible for the storage device 15 to use a semiconductor memory, such as a flash memory, a magnetic recording medium, such as a hard disk, or the like. When the storage device 15 stores the image processing program PRO, the storage device 15 becomes a computer-readable medium storing the image processing program PRO.

It is possible to use a pointing device, a hard key such as a keyboard key, a touch panel attached to the surface of a display panel, or the like for the input device 16. The communication interface 17 is connected to a communication interface 21 of the printer 20 in a wired or wireless manner and inputs and outputs information, such as print data, or the like to and from the printer 20. The connection with the communication interfaces 17 and 21 may be a local connection, such as a USB connection, or a network connection, such as a LAN or Internet connection. Here, USB is an abbreviation of "Universal Serial Bus", and LAN is an abbreviation of "local area network".

In this regard, the image processing apparatus 10 includes a computer, and the like, such as a personal computer including a tablet terminal. For example, when the system unit of a desktop personal computer is used as the image processing apparatus 10, the printer 20 and the display device 30 are connected to the system unit. When a computer with an integrated display, such as a notebook computer, is used as the image processing apparatus 10, the printer 20 is connected to this computer. In a host device with an integrated display, display data is output to an internal display device in the same manner as above. Also, the image processing apparatus 10 may include all components in a single casing, and may alternatively include a plurality of separate devices capable of communicating with each other. Further, it is possible to implement the present technique when at least a part of the printer 20 is included in the image processing apparatus 10.

The printer 20 illustrated in FIG. 1 is an ink jet printer that discharges C ink, M ink, Y ink, K ink, Fy ink, and CL ink from the recording head 22 as recording materials. Here, C denotes cyan, M denotes magenta, Y denotes yellow, K denotes black, Fy denotes a yellow fluorescent color, and CL denotes clear. CL ink is sometimes referred to as gloss ink or varnish ink and gives a surface effect, such as texture, embossment, and the like to a print image IM1. Ink cartridges Cc, Cm, Cy, Ck, Cfy, and Ccl supply ink of C, M, Y, K, Fy, and CL, respectively, to the recording head 22. The recording head 22 ejects ink droplets 28 of C, M, Y, K, Fy, and CL from nozzle Nc, Nm, Ny, Nk, Nfy, and Ncl, respectively, in accordance with the print data from the image processing apparatus 10. When ink droplets 28 impact a medium ME0, which is a printing material (print substrate), ink dots are formed on the medium ME0. As a result, a printed material having the output image IM1 that corresponds to the print data on the medium ME0 is obtained. The output image IM1 includes a color chart.

FIG. 2 schematically illustrates a printed material of a first toning chart CH1, which is also referred to as an approximate color chart. In the printing industry, and the like, to perform color matching by using a print result, an approximate color chart including a plurality of patches with a specified reference color as center is used. As illustrated in FIG. 2, the first toning chart CH1 on the medium ME0 includes a plurality of first toning patches PA1 arranged at intervals of a color difference in lightness L ($\Delta$L), at intervals of a color difference in the color coordinate a ($\Delta$a), and at intervals of a color difference in the color coordinate b ($\Delta$b) with a reference patch PA1$c$ corresponding to the specified color value. Here, an L value, an a value, and a b value are individual coordinate values in the Lab color space. For a color difference, it is possible to use the color difference $\Delta E_{00}$ denoted by the CIEDE2000 color difference formula, the color difference $\Delta E^*_{94}$ denoted by the CIE 1994 color difference formula, and the color difference $\Delta E^*_{76}$ proposed in 1976, and the like. The color differences $\Delta$L, $\Delta$a, and $\Delta$b may have a relationship in which $\Delta L = \Delta a = \Delta b$, or a part of or all of the color differences may have different values. The first toning chart CH1 illustrated in FIG. 2 includes 27 first toning patches PA1, which are produced by changing individual L values, a values, and b values into three stages. The number of first toning patches PA1 may be greater than 27, such as $5^3$, or the like, or less than 27. A specific patch PA10 surrounded by the bold line in FIG. 2 illustrates a patch selected by a user.

When a user uses the first toning chart CH1 including the plurality of first toning patches PA1 each having different Lab values, it is possible for the user to select a hue based on the difference in Lab value. Here, the Lab value represents a color value indicating coordinate values in the Lab color space and includes an L value, an a value, and a b value. When the ink content differs for each of the first toning patches PA1 having the same Lab value, the color characteristics are different. For example, when a plurality of kinds of ink include ink of a fluorescent color Fy, and when individual first toning patches PA1 have the same color value but have different fluorescent color Fy ink contents, each patch emits fluorescence in a correspondingly different manner. In such a case, when the user views the first toning chart CH1, it is not possible for the user to confirm the difference in the color characteristics when the same Lab values exist. Accordingly, in this specific example, as illustrated in FIG. 3, a second toning chart CH2 is used that includes individual second toning patches PA2 having used ink amounts indicated by the recording material values corresponding to a plurality of Lab values of the selected specific patch PA10.

FIG. 3 schematically illustrates a printed material of the second toning chart CH2. The second toning chart CH2 on the medium ME0 includes individual second toning patches PA2 having used ink amounts indicated by a plurality of specific recording material values corresponding to the specific color values (L0, a0, b0) of the specific patch PA10. FIG. 3 illustrates that the specific color values (L0, a0, b0) common to a plurality of second toning patches PA2 are (110, 50, 50), that the specific recording material values (C1, M1, Y1, K1, Fy1) of the patch PA21 located at the "C1" position are (25, 0, 63, 0, 15), and that the specific recording material values (C2, M2, Y2, K2, Fy2) of the patch PA22 located at the "C3" position are (25, 0, 73, 0, 5). When using the second toning chart CH2, it is possible for the user to select a color having desired color characteristics from a plurality of second toning patches PA2 having the same Lab value but different amounts of ink used.

FIG. 4 schematically illustrates the structure of the color conversion table 51 included in a fluorescence characteristic confirmation color profile 50 used for printing the second toning chart CH2. The color conversion table 51 includes data representing corresponding relationships CO between color values Lab0j, which are coordinate values in the Lab color space, and recording material values CMYKFyij, which correspond to used ink amounts. Here, i is a variable for identifying n recording material values corresponding to respective common color values Lab0j; n is an integer representing quantity; j is a variable for identifying m grid points set in a virtual Lab color space; and m is an integer representing quantity. It is assumed that the plurality of grid points in the color conversion table 51 are arranged substantially at regular intervals in the a-axis direction, the b-axis direction, and the L-axis direction of the Lab color space. The individual color values Lab0j denote color values (L0j, a0j, b0j), and the individual recording material values CMYKFyij denote recording material values (Cij, Mij, Yij, Kij, Fyij). Color values Lab0, that is, (L0, a0, b0), represent color values (L0j, a0j, b0j), and recording material values CMYKFyi, that is, (Ci, Mi, Yi, Ki, Fyi), represent recording material values (Cij, Mij, Yij, Kij, Fyij).

As illustrated in the upper part of FIG. 4, the color conversion table 51 includes the corresponding relationship CO between the color values Lab0 and the recording material values CMYKFy1, the corresponding relationship CO between the color values Lab0 and the recording material values CMYKFy2, ..., the corresponding relationship CO between the color values Lab0 and the recording material values CMYKFyi, ..., and the corresponding relationship CO between the color values Lab0 and the recording material values CMYKFyn. As illustrated in the lower part of FIG. 4, when attention is paid to the corresponding relationship CO between the color values Lab0 and the recording material values CMYKFyi, it is understood that the color values (L0j, a0j, b0j) are associated with the recording material values (Cij, Mij, Yij, Kij, Fyij). When printing is performed using the color conversion table 51, one corresponding relationship from the plurality of corresponding relationships CO is used. It is assumed that the default corresponding relationship is the corresponding relationship when i=1.

3. Specific Example of Processing Performed by Image Processing Apparatus

FIG. 5 schematically illustrates the color setting processing performed by the image processing apparatus 10. Here, steps S102 to S108 correspond to the first processing, the first step ST1, and the first toning chart print control function FU1. Steps S110 to S112 correspond to the second processing, the second step ST2, and the specific color value determination function FU2. Step S114 corresponds to the third processing, the third step ST3, and the specific recording material value obtaining function FU3. Step S116 corresponds to the fourth processing, the fourth step ST4, and the second toning chart print controlling function FU4. Step S118 corresponds to the fifth processing, the fifth step ST5, and the second toning patch selection function FU5. In the following, the description of "step" is omitted. The image processing apparatus 10 executes a plurality of processes in parallel by multitasking.

When the color setting processing is started, in S102, the controller 11 sets the color profile 50 to be used for printing the toning charts CH1 and CH2. For example, it is assumed that as combinations of the kinds of ink to be used, there are a first combination including five kinds of ink: C, M, Y, K, and Fy, a second combination including four kinds of ink: C, M, Y, and K, and a third combination including five kinds of ink: C, M, Y, K, and CL. It is assumed that the plurality of color profiles include a fluorescence characteristic confirmation color profile for using the first combination of ink, a graininess confirmation color profile for using the second combination of ink, and a surface effect confirmation color profile for using the third combination of ink. In this case, the controller 11 ought to receive any one of the combinations from the first combination, the second combination, and the third combination from the input device 16, and set the received combination for printing the corresponding color profile. In this regard, when a surface effect confirmation color profile is not used, a combination of ink to be used does not need to include CL ink. When a fluorescence characteristic confirmation color profile is not used, a combination of ink to be used does not need to include Fy ink. When neither the surface effect confirmation color profile nor the fluorescence characteristic confirmation color profile is used, a combination of ink to be used needs to include neither CL ink nor Fy ink.

Figure 6:
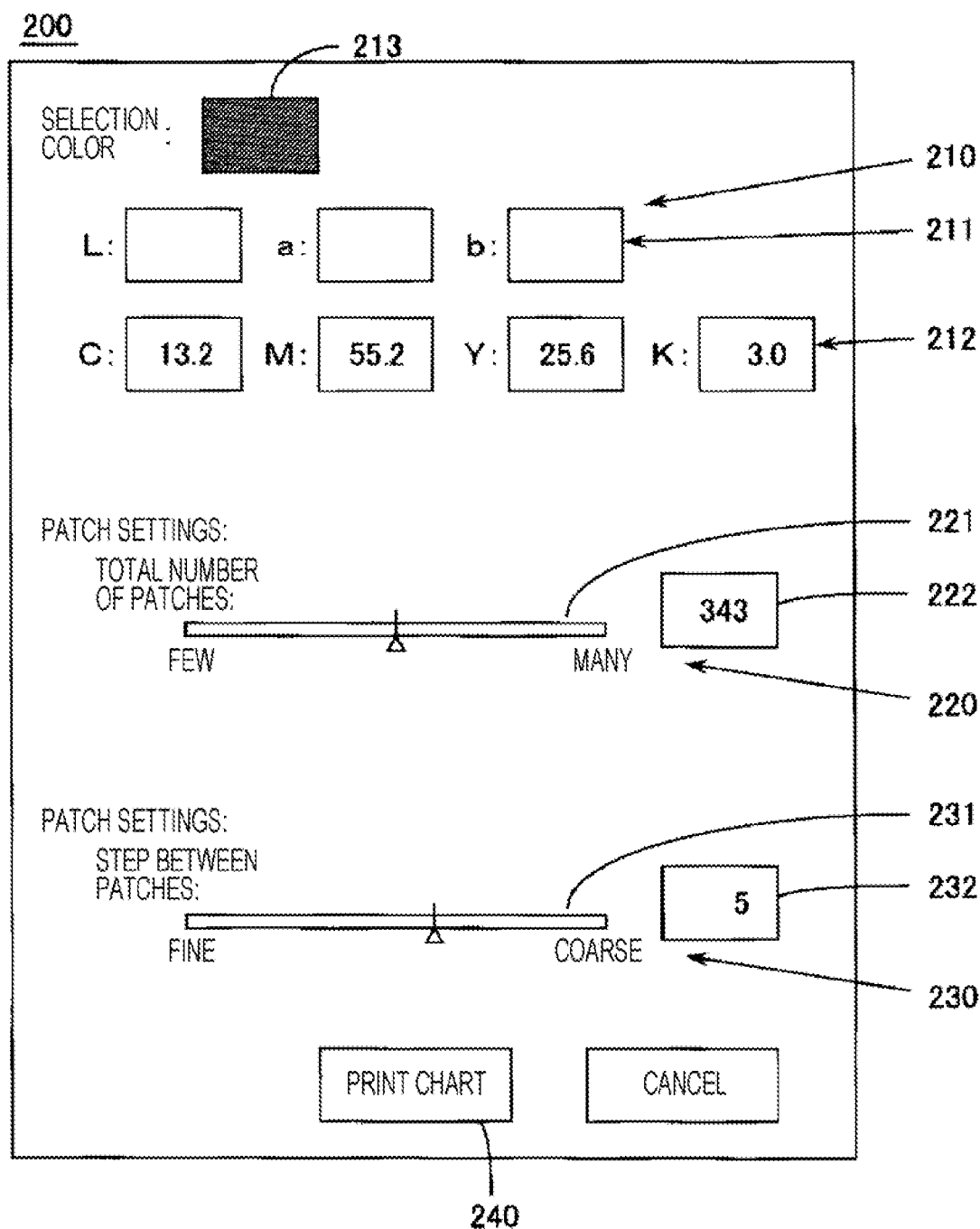
FIG. 6 is a diagram schematically illustrating an example of a user interface screen.

After setting the color profile 50, the controller 11 causes the display device 30 to display a UI screen 200 illustrated in FIG. 6 in S104, and receives the settings of the center color corresponding to the center patch PA1c illustrated in FIG. 2 from the input device 16. Here, UI is an abbreviation of user interface. The UI screen 200 illustrated in FIG. 6 includes an input area 210 of a center color, an input area 220 of the number of first toning patches PA1 included in the first toning chart CH1, an input area 230 of a color difference interval at which first toning patches PA1 are arranged, a print chart button 240, and the like. The center color input area 210 illustrated in FIG. 6 includes input fields 211 of Lab values, and input fields 212 of CMYK values. The controller 11 receives operation input of Lab values in the input fields 211 of Lab values from the input device 16, sets the input Lab values as a center color, and displays the center color on the display field 213. Also, the controller 11 receives operation input of CMYK values in the input fields 212 of CMYK values from the input device 16, converts the input CMYK values to Lab values, sets the Lab values as a center color, and displays the center color on the display field 213. Here, CMYK values represents a C value corresponding to the amount of C ink used, an M value corresponding to the amount of M ink used, a Y value corresponding to the amount of Y ink used, and a K value corresponding to the amount of K ink used. It is possible to convert from CMYK values to Lab values by referring to the corresponding relationship CO when i=1 in the color conversion table 51 of the color profile 50. In this regard, it is not necessary to have either the input fields 211 of Lab values or the input fields 212 of CMYK values.

Also, in S106, the controller 11 receives the setting of the number of first toning patches PA1 included in the first toning chart CH1 and the setting of the color difference interval at which the first toning patches PA1 are arranged from the input device 16. For example, the controller 11 receives operation input to a slider control 221 in which a slider is movable along a lateral slider bar in the input area 220 of the number of patches from the input device 16, sets the number of patches in accordance with the position of the slider, and display the number of patches in the number of patches field 222. For example, when setting the arrangement of the first toning patches PA1 to Np levels individually for the L value, the a value, and the b value, the number of first toning patches PA1 is set to $Np^3$. When Np=7, as illustrated in FIG. 6, the number of patches become 343. Also, in the input area 230 of color difference interval, the controller 11 receives operation input to a slider control 231 in which a slider is movable along the lateral slider bar from the input device 16, sets a color difference interval in accordance with the position of the slider, and displays the color difference interval in a color difference interval field 232. FIG. 6 illustrates that the color difference interval at which the first toning patches PA1 are arranged is set to 5.

In this regard, the processing of S104 may be performed after the processing of S106. The processing of S104 and S106 is repeatedly performed until the print chart button 240 is operated by the input device 16. When the controller 11 receives operation of the print chart button 240 by the input device 16, the processing proceeds to S108, and as illustrated in FIG. 2, the controller 11 causes the printer 20 to print the first toning chart CH1 including a plurality of first toning patches PA1 each having different Lab values. As illustrated in FIG. 2, the controller 11 may cause the printer 20 to print characters for identifying respective first toning patches PA1. It is possible to perform the processing of S108, for example, as described in the following.

First, the controller 11 determines Lab values of the individual first toning patches PA1 based on the information set by the processing of S104 to S106, that is to say, the Lab value of the center color, the number of first toning patches PA1, and the color difference interval at which the first toning patches PA1 are arranged. Next, the controller 11 converts the Lab values to recording material values corresponding to the respective used ink amounts for the individual first toning patches PA1 by referring to a corresponding relationship CO corresponding to i=1 in the color conversion table 51. For example, when a fluorescence characteristic confirmation color profile is set, Lab values of the individual first toning patches PA1 are converted to CMYKFy values. Here, CMYKFy values represent a C value, an M value, a Y value, a K value, and an Fy value. When there are no Lab values of first toning patches PA1 in the color conversion table 51, it is possible for the controller 11 to convert Lab values to the corresponding CMYKFy values by interpolation operation using the CMYKFy values corresponding to the plurality of respective grid points surrounding the Lab values of the first toning patches PA1.

After the first toning chart CH1 is printed, in S110, the controller 11 receives selection operation of a first toning patch PA1 included in the first toning chart CH1 from the input device 16. For example, the controller 11 may receive operation input of a character corresponding to the specific patch PA10 in a character group added to the first toning chart CH1 illustrated in FIG. 2 from the input device 16. In this case, a user ought to perform operation input of "G3" corresponding to the specific patch PA10 from the input device 16. Also, the controller 11 may cause the display device 30 to display a screen indicating the disposition of the receive first toning patch PA1 included in the first toning chart CH1, and receive selection operation of a specific patch PA10 on the displayed screen from the input device 16.

After receiving patch selection operation, in S112, the controller 11 determines specific color values (L0, a0, b0) corresponding to the specific patch PA10. As described above, the individual first toning patches PA1 are corresponding to respective Lab values, and thus the controller 11 ought to obtain Lab values corresponding to the specific patch PA10 as specific color values (L0, a0, b0). By the above, specific color values (L0, a0, b0) in accordance with the selection operation of the first toning patch PA1 included in the first toning chart CH1 are determined.

After specific color values are determined, in S114, the controller 11 obtains a plurality of specific recording material values (Ci, Mi, Yi, Ki, Fyi) corresponding to specific color values (L0, a0, b0) from the color conversion table 51 as illustrated in FIG. 4. For example, when the specific color values are (L0j, a0j, b0j), the controller 11 ought to search for specific recording material values corresponding to the specific color values (L0j, a0j, b0j) from the color conversion table 51, and obtain specific recording material values (C1j, M1j, Y1j, K1j, Fy1j), (C2j, M2j, Y2j, K2j, Fy2j), . . . , (Cij, Mij, Yij, Kij, Fyij), . . . , (Cnj, Mnj, Ynj, Knj, Fynj). When there are no specific color values (L0, a0, b0) in the color conversion table 51, it is possible for the controller 11 to obtain a plurality of specific recording material values (Ci, Mi, Yi, Ki, Fyi) corresponding to the specific color values (L0, a0, b0) by interpolation operation using CMYKFy values corresponding to a plurality of grid points surrounding the specific color values (L0, a0, b0). By the above, a plurality of specific recording material values (Ci, Mi, Yi, Ki, Fyi) associated with the specific color values (L0, a0, b0) are obtained in accordance with the plurality of corresponding relationships CO included in the color profile 50.

After the plurality of specific recording material values are obtained, in S116, the controller 11 causes the printer 20 to print the second toning chart CH2 including the second toning patches PA2 of the used ink amounts corresponding to the individual specific recording material values (Ci, Mi, Yi, Ki, Fyi) as illustrated in FIG. 3. The individual second toning patches PA2 are formed by respective used ink amounts corresponding to the specific recording material values (Ci, Mi, Yi, Ki, Fyi). As illustrated in FIG. 3, the controller 11 may cause the printer 20 to print a character for identifying each of the second toning patches PA2.

As described above, the plurality of second toning patches PA2 included in the second toning chart CH2 are the patches that all indicate the specific color values (L0, a0, b0). However, the individual second toning patches PA2 have components of CMYKFy ink that differ little by little. For example, in FIG. 3, the specific recording material values (C1, M1, Y1, K1, Fy1) of a patch PA21 located at a position "C1" are (25, 0, 63, 0, 15), and the specific recording material values (C2, M2, Y2, K2, Fy2) of a patch PA22 located at a position "C3" are (25, 0, 73, 0, 5). When attention is paid to patches PA21 and PA22, the used ink amount corresponding to the specific recording material value Fy1 of Fy in the patch PA21 is an example of the first amount of fluorescent color used, and the used ink amount corresponding to the specific recording material value Fy2 of Fy in the patch PA22 is an example of the second amount of fluorescent color used. Of course, a combination of the patches of the first amount of fluorescent color used and patches of the second amount of fluorescent color used is selected from the second toning chart CH2 freely.

After printing the second toning chart CH2, in S118, the controller 11 receives selection operation of a second toning patch PA2 included in the second toning chart CH2 from the input device 16. For example, the controller 11 may receive operation input of a character corresponding to the selected patch PA20 in the character group added to the second toning chart CH2 illustrated in FIG. 3 from the input device 16. In this case, the user ought to perform operation input of "B3" corresponding to the selection patch PA20 from the input device 16. Also, the controller 11 may cause the display device 30 to display a screen indicating the disposition of the second toning patches PA2 included in the second toning chart CH2, and receive selection operation of the selected patch PA20 on the displayed screen from the input device 16. By the above, it is possible for the user to select a color having a desired fluorescence characteristic in accordance with the amount of Fy ink used while having the same Lab value from a plurality of colors having different fluorescence characteristics.

In order to reproduce color having the fluorescence characteristic indicated by the specific patch PA10 and the selected patch PA20, the controller 11 may generate a user-specific color conversion table in S120. After that, the controller 11 terminates the color setting processing. Here, it is assumed that the recording material values of the selected patch PA20 are (Cs, Ms, Ys, Ks, Fys). For example, it is possible for the controller 11 to generate a user-specific color conversion table by corresponding the Lab values of center color set in S104 to the recording material values (Cs, Ms, Ys, Ks, Fys) in an original color conversion table representing the corresponding relationship CO when i=1 in the color conversion table 51 included in the color profile 50. In this manner, color management is performed. When print data is generated by referring to a user-specific color conversion table, and the printer 20 performs printing in accordance with the print data, a color having the fluorescence characteristic of a user's preference is reproduced on a print image.

By the above-described color setting processing, a second toning chart CH2 is printed that includes second toning patches PA2 of the used ink amounts corresponding to the plurality of respective different specific recording material values (Ci, Mi, Yi, Ki, Fyi) and having the same specific color values (L0, a0, b0). It is possible for the user to confirm the shining way of the fluorescence ink having the same hue by viewing the second toning chart CH2 and to select color having desired color characteristics without changing hue. Thus, it becomes possible to simply adjust how the fluorescence shines. Accordingly, in this specific example, it becomes possible to select color having desired color characteristics when the color characteristics differ in accordance with the used ink amount in the case of having the same color value. Also, a combination of inks includes K ink, and thus in this specific example, it becomes possible to select color having a desired graininess from a plurality of colors having different graininesses in accordance with the amounts used of K ink in the case of having the same color value.

In this regard, printers include a transfer type printer, such as a sublimation transfer printer that forms an output image on transfer paper by using sublimation type ink. For example, when a team color is transferred to a uniform, a transfer type printer prints the team color on transfer paper, and a transfer apparatus transfers the team color on the uniform. In addition, it is thought of the case where corporate color is transferred to a uniform, and the like. In such a case, it is desirable not to select a patch from a color chart printed on a transfer paper, but to select a patch from a color chart transferred on another medium from the transfer paper. First, a description will be given of an example of a transfer apparatus that transfers a print image from transcription to another medium, for example, cloth with reference to FIG. 7.

FIG. 7 schematically illustrates a thermal transfer apparatus 300. The transfer apparatus 300 illustrated in FIG. 7 includes a heating plate 323, a support post 329, a pressing plate 322, a handle 321, and a controller 325. The heating plate 323 heats a laminate of a thermal transfer paper ME1 to which a print image is attached and cloth ME2. Here, the thermal transfer paper ME1 is an example of the first medium, and the cloth ME2 is an example of the second medium. The support post 329 extends from one edge of the heating plate 323 in the direction intersecting a heating surface 323a of the heating plate 323. The pressing plate 322 is supported by the support post 329 and is rotatably operated in the direction denoted by a double arrow S, that is to say, in the direction approaching the heating surface 323a and in the direction leaving the heating surface 323a. The handle 321 is attached to the pressing plate 322. The controller 325 receives the settings of the heating condition of the heating plate 323 from a user. The controller 325 illustrated in FIG. 7 is a tablet terminal including a touch panel 326 and is connected to a main body 320 of the transfer apparatus 300 by a communication cable 327, and controls operation of the transfer apparatus 300 via the communication cable 327.

When the laminate of the thermal transfer paper ME1 and the cloth ME2 is mounted on the heating plate 323, is sandwiched by the heating plate 323 and the pressing plate 322 by operation of the handle 321, and is heated, a print image is transferred from the thermal transfer paper ME1 to the cloth ME2. When print images are toning charts CH1 and CH2, the toning charts CH1 and CH2 are transferred onto the cloth. Of course, the transfer apparatus 300 is not limited to the example illustrated in FIG. 7. For example, the transfer apparatus 300 may unroll the rolled thermal transfer paper ME1 and put the paper ME1 on the cloth ME2, and heat and press the laminate by a heating roller so as to transfer the print image from the thermal transfer paper ME1 to the cloth ME2.

In the color setting processing illustrated in FIG. 5, the processing of S108 is the processing performed by the printer 20, which is a transfer type printer, for attaching the first toning chart CH1 to the thermal transfer paper ME1 using sublimation type ink. After this processing, the user puts the thermal transfer paper ME1 on the cloth ME2 with the surface on which the first toning chart CH1 is attached facing the cloth ME2, mounts this laminate on the heating surface 323a of the transfer apparatus 300, and sandwiches the laminate between the heating plate 323 and the pressing plate 322 by operation of the handle 321. When the laminate sandwiched by the heating plate 323 and the pressing plate 322 is heated, the first toning chart CH1 is transferred from the thermal transfer paper ME1 to the cloth ME2. The processing of S110 is the processing that receives selection operation of a first toning patch PA1 in the first toning chart CH1 transferred to the cloth ME2 from the input device 16. It is possible for the user to accurately select a first toning patch PA1 having a desired hue by viewing the first toning chart CH1 transferred to the cloth ME2.

Also, the processing of S116 is the processing performed by the printer 20 for attaching the second toning chart CH2 to the thermal transfer paper ME1 using sublimation type ink. After this processing, the user puts the thermal transfer paper ME1 on the cloth ME2 with the surface on which the second toning chart CH2 is attached facing the cloth ME2, mounts this laminate on the heating surface 323a of the transfer apparatus 300, and sandwiches the laminate between the heating plate 323 and the pressing plate 322 by operation of the handle 321. When the laminate sandwiched by the heating plate 323 and the pressing plate 322 is heated, the second toning chart CH2 is transferred from the thermal transfer paper ME1 onto the cloth ME2. Thereby, the transfer step ST6 for transferring the color chart printed on the first medium onto the second medium is performed. The processing of S118 is the processing that receives selection operation of a second toning patch PA2 included in the second toning chart CH2 transferred onto the cloth ME2 from the input device 16. It is possible for the user to accurately select a second toning patch PA2 having desired color characteristics by viewing the second toning chart CH2 transferred onto the cloth ME2.

Also, in the processing of S102 illustrated in FIG. 5, when a graininess confirmation color profile is set, four kinds of ink, namely C, M, Y, and K are used. In this case, the color conversion table 51 has data representing a corresponding relationship CO between the color values Lab0j and the recording material value CMYKij. That is to say, the color conversion table 51 in the graininess confirmation color profile has data produced by removing Fy values from the color conversion table illustrated in FIG. 4.

FIG. 8 schematically illustrates an example of a printed material of the second toning chart CH2 when a graininess confirmation color profile is used. The second toning chart CH2 on the medium ME0 includes individual second toning patches PA2 of used ink amounts indicated by the plurality of specific recording material values corresponding to the specific color values (L0, a0, b0) of the specific patches PA10. FIG. 8 indicates that the common specific color values (L0, a0, b0) to the plurality of second toning patches PA2 are (10, 50, 50), specific recording material values (C1, M1, Y1, K1) of the patch PA21 located at the position "C1" are (23, 0, 0, 50), and the specific recording material values (C2, M2, Y2, K2) of the patch PA22 located at the position "C3" are (25, 0, 0, 60). When attention is paid to the patches PA21 and PA22, the used ink amount corresponding to the specific recording material value K1 of K in the patch PA21 is an example of the first amount of black used, and the used ink amount corresponding to the specific recording material value K2 of K in the patch PA22 is an example of the second black amount used. Of course, a combination of a patch of the first amount of black used and a patch of the second black amount used is selected from the second toning chart CH2 freely.

When a second toning chart CH2 in accordance with a graininess confirmation color profile is used, it is possible for the user to confirm graininess of K ink dots when having the same hue, to select a color having desired graininess without changing the hue, and thus it becomes possible for the user to simply adjust the ink amount while suppressing the graininess. Accordingly, in the example in FIG. 8, it becomes possible to select a color having a desired graininess from a plurality of colors having the same color value, but having a different graininess in accordance with the amount of K ink used. Also, it becomes possible not only to confirm graininess, but also to simply adjust the ink amount against color shift of gray, such as "red shift", in which M is mixed in gray color. In particular, when various special ink is used in combination, color shift of gray arises, such as "red shift". In such a case, it is desirable to apply the present technique.

Further, in the processing of S102 illustrated in FIG. 5, when a surface effect confirmation color profile is set, five kinds of ink, namely C, M, Y, K, and CL are used. In this case, the color conversion table 51 includes data representing the corresponding relationship CO between the color values Lab0j and the recording material values CMYKCLij. That is to say, the color conversion table 51 in the surface effect confirmation color profile includes data in which Fy values in the color conversion table illustrated in FIG. 4 has changed to CL values. In general, when CL ink dots are mixed in a print image, the L value becomes high. Accordingly, when the amount of CL ink used increases, the recording material values CMYKCLij are set so that the L value are lowered by C, M, Y, and K ink.

When CL ink dots are put on C, M, Y, and K ink dots on a print image, the controller 11 ought to generate print data such that CL ink dots are put on C, M, Y, and K ink dots, and transmit the print data to the printer 20. The printer 20 that has received the print data drives the recording head 22 so as to put CL ink dots on C, M, Y, and K ink dots based on the print data, and forms a print image having CL ink dots on its surface on the medium.

FIG. 9 schematically illustrates an example of a printed matter of the second toning chart CH2 when a surface effect confirmation color profile is used. The second toning chart CH2 on the medium ME0 includes individual second toning patches PA2 having the used ink amounts indicated by a plurality of specific recording material values corresponding to the specific color values (L0, a0, b0) of a specific patch PA10. FIG. 9 illustrates that the common specific color values (L0, a0, b0) among a plurality of second toning patches PA2 are (110, 50, 50), the specific recording material values (C1, M1, Y1, K1, CL1) of the patch PA21 located at the position "C1" are (25, 0, 63, 0, 15), and the specific recording material values (C2, M2, Y2, K2, CL2) of the patch PA22 located at the position "C3" are (27, 2, 65, 0, 5). When attention is paid to the patches PA21 and PA22, the used ink amount corresponding to the specific recording material value CL1 of CL in the patch PA21 is an example of the first clear amount used, and the used ink amount corresponding to the specific recording material value CL2 of CK in the patch PA22 is an example of the second clear amount used. Of course, a combination of a patch of the first clear amount used and a patch of the second clear amount used is selected from the second toning chart CH2 freely.

When using a second toning chart CH2 in accordance with a surface effect confirmation color profile, it is possible for the user to confirm surface effects, such as texture, unevenness, and glossiness while having the same hue, and select a color having desired surface effects without changing the hue. Accordingly, it becomes possible for the user to simply adjust surface effects. Accordingly, in the example illustrated in FIG. 9, it becomes possible to select a color having desired surface effects in accordance with the amount of CL ink used from a plurality of colors having different surface effects even when having the same color value. Also, since K ink is included in the ink combination, in the example illustrated in FIG. 9, it becomes possible to select a color having a desired graininess in accordance with the amount of K ink used from a plurality of colors having different graininesses when having the same color value.

In the various specific examples described above, in addition to using the first toning chart CH1 for confirming color differences, it is possible to perform color management using the second toning chart CH2 for confirming fluorescence, graininess, glossiness, and the like. Thereby, it becomes possible to generate print products having desired color characteristics in fluorescence, graininess, glossiness, and the like.

4. Variations

Various variations are considered from the present disclosure. For example, the printer is not limited to an ink jet printer, and may be a printer of an electrophotographic method, such as a laser printer that uses toner as a recording material, or the like. Also, the printer may be a copy machine, a facsimile, a complex machine having these functions, or the like. The kinds of combinations of recording materials to use are not limited to the examples described above. For example, it becomes possible to select a color so as to have desired color characteristics in graininess, fluorescence characteristic, and surface characteristic by combining all the six kinds of recording materials, that is to say, C, M, Y, K, Fy, and CL. Also, the combinations of the recording materials may include at least part of C, light cyan Lc having a lower density than that of C, light magenta Lm having a lower density than that of M, dark yellow Dy having a higher density than that of Y, orange Or, green Gr, a fluorescent color other than Fy, and the like.

When specific color values (L0, a0, b0) are determined by selecting a specific patch PA10 from the first toning chart CH1, it is assumed that a color having desired color characteristics is not included in a plurality of second toning patches PA2 in the second toning chart CH2. In this case, it is thought that a specific patch PA10 is reselected from the first toning chart CH1, and the second toning chart CH2 is printed again. However, this takes time and effort. Thus, as illustrated by an example in FIG. 10, in addition to a first patch group G1 including a plurality of second toning patches PA2 corresponding to the specific color values (L0, a0, b0), a second toning chart CH2 including a second patch group P2 including a plurality of second toning patches PA2 corresponding to peripheral color values having a predetermined color difference with the specific color value may be printed.

The first patch group G1 includes second toning patches PA2 of the used ink amounts corresponding to the individual specific recording material values corresponding to the specific color values (L0, a0, b0). The second patch group P2 includes second toning patches PA2 of the used ink amounts corresponding to the individual specific recording material values corresponding to the peripheral color values. It is possible to determine the peripheral color values to be, for example, Lab values having the color difference of $\Delta a = \Delta b = \Delta L$ from the specific color values (L0, a0, b0). The second toning chart CH2 illustrated in FIG. 10 illustrates that, with the first patch group G1 as center, the a value in the patch groups G1 and G2 changes by $\Delta a$ in the right direction, and the b value in the patch groups G1 and G2 changes by $\Delta b$ in the up direction. That is to say, the value of the three pairs of second patch groups G2 located at the rightmost in the second toning chart CH2 is larger than the a value of the first patch group G1 by $\Delta a$, and the a value of the three pairs of second patch groups G2 located at the leftmost in the second toning chart CH2 is smaller than the a value of the first patch group G1 by $\Delta a$. Also, the b value of the three pairs of second patch groups G2 located at the uppermost in the second toning chart CH2 is larger than the b value of the first patch group G1 by $\Delta b$, and the b value of the three pairs of second patch groups G2 located at the lowermost in the second toning chart CH2 is smaller than the b value of the first patch group G1 by $\Delta b$. Although not illustrated in FIG. 10, the second toning chart CH2 may include a second patch group G2 having a different L value from that of the first patch group G1.

It is possible for a user who views the second toning chart CH2 illustrated in FIG. 10 to select a patch having desired color not only from the first patch group G1 of the specific color values (L0, a0, b0), but also from the second patch groups G2 having the peripheral color values. Thereby, it becomes possible to select a color with higher priority on the color characteristics than the specific color values to be a reference. In this regard, when the selected patch PA20 is included in the second patch group G2, as illustrated in FIG. 4, in the original color conversion table representing the corresponding relationship CO when i=1, color management is performed by associating the recording material values (Cs, Ms, Ys, Ks, Fys) of the selected patch PA20 with the Lab values of the center color.

5. Conclusion

As described above, with the present disclosure, it is possible to provide a technique of an image reading apparatus, and the like that enables a user to select a color having desired color characteristics when the color characteristics differ in accordance with the amount of the recording material used while having the same color value by various modes. Of course, with a technique including only components according to an independent claim, it is possible to obtain basic operational advantages described above. Also, it is possible to implement a configuration produced by mutually replacing or combining each component disclosed in the examples described above, a configuration produced by mutually replacing or combining each component of a publicly known technique and the examples described above, and the like. The present disclosure includes these configurations, and the like.

What is claimed is:

1. An image processing apparatus for causing a printer to perform printing, the image processing apparatus comprising:

a memory storing a color profile including a plurality of corresponding relationships between color values being coordinate values in a color space and recording material values corresponding to respective amounts of recording materials used; and a processor configured to cause the printer to print a color chart, wherein the processor obtains a plurality of specific recording material values being the recording material values corresponding to specific color values in accordance with the plurality of corresponding relationships included in the color profile, and causes the printer to print the color chart including patches having the corresponding amounts of the individual specific recording material values used, wherein each patch of the color chart has a common specific color value but a different specific recording material value, wherein the color chart is a second toning chart and the processor is configured to cause the processor to print a first toning chart before the second toning chart, the first toning chart including a plurality of first toning patches as the plurality of patches and the second toning chart including a plurality of second toning patches as the plurality of patches, and the processor performs first processing that causes the printer to print the first toning chart including the plurality of first toning patches each having different color values, second processing that determines the specific color values in accordance with a selection operation of the first toning patches included in the first toning chart, third processing that obtains the plurality of specific recording material values corresponding to the specific color values in accordance with the plurality of corresponding relationships, fourth processing that causes the printer to print the second toning chart including the second toning patches of the used amounts corresponding to the individual specific recording material values, and fifth processing that receives selection of the second toning patches included in the second toning chart.

2. The image processing apparatus according to claim 1, wherein
the recording material values include values corresponding to the respective amounts used of cyan, magenta, yellow, black, and fluorescent color used, and
the color chart includes the patch in which the amount of the fluorescent color used is a first amount of fluorescent color and the patch in which the amount of the fluorescent color used is a second amount of fluorescent color different from the first amount of fluorescent color.

3. The image processing apparatus according to claim 1, wherein
the recording material values include values corresponding to the respective amounts of cyan, magenta, yellow, and black used, and
the color chart includes the patch in which the amount of the black used is a first amount of black and the patch in which the amount of the black used is a second black amount different from the first amount of black.

4. The image processing apparatus according to claim 1, wherein
the recording material values include values corresponding to the respective amounts of cyan, magenta, yellow, black, and clear used, and
the color chart includes the patch in which the amount of the clear used is a first amount of clear and the patch in which the amount of the clear used is a second clear amount different from the first clear amount.

5. The image processing apparatus according to claim 1, wherein
the processor causes the printer to print the color chart including a first patch group including the patch of the used amounts corresponding to the individual material values corresponding to the specific color values and a second patch group including the patches of the used amounts corresponding to the individual specific recording material values corresponding to peripheral color values that differ from the specific color values by a predetermined color difference.

6. An image processing method for causing a printer to perform printing, the image processing method comprising:
in accordance with the plurality of corresponding relationships included in the color profile including a plurality of corresponding relationships between color values being coordinate values in a color space and recording material values corresponding to respective amounts of recording materials used, an obtaining step of obtaining a plurality of specific recording material values being the recording material values corresponding to specific color values being coordinate values in the color space; and
a first controlling step of causing the printer to print a color chart including patches having the corresponding amounts of the individual specific recording material values used,
wherein
the color chart is a second toning chart and the processor is configured to cause the processor to print a first toning chart before the second toning chart, the first toning chart including a plurality of first toning patches as the plurality of patches and the second toning chart including a plurality of second toning patches as the plurality of patches, and
a second controlling step of causing a processor of the printer to perform
first processing that causes the printer to print the first toning chart including the plurality of first toning patches each having different color values,
second processing that determines the specific color values in accordance with a selection operation of the first toning patches included in the first toning chart,
third processing that obtains the plurality of specific recording material values corresponding to the specific color values in accordance with the plurality of corresponding relationships,
fourth processing that causes the printer to print the second toning chart including the second toning patches of the used amounts corresponding to the individual specific recording material values, and
fifth processing that receives selection of the second toning patches included in the second toning chart.

7. The image processing method according to claim 6, wherein
the printer prints the color chart on a first medium, and
the image processing method further includes
a transferring step of transferring the color chart printed on the first medium onto a second medium, and
a receiving step of receiving selection operation of the patch included in the color chart transferred onto the second medium.

8. A non-transitory recording medium storing an image processing program for causing a printer to perform printing, the image processing program causing a computer to perform functions comprising:
by using a color profile including a plurality of corresponding relationships between color values being coordinate values in a color space and recording material values corresponding to respective amounts of recording materials used in accordance with the plurality of corresponding relationships included in the color profile, an obtaining function of obtaining a plurality of specific recording material values being the recording material values corresponding to specific color values being coordinate values in the color space; and
a first controlling function of causing the printer to print a color chart including patches having the corresponding amounts of the individual specific recording material values used, wherein each patch of the color chart has a common specific color value but a different specific recording material value,
wherein
the color chart is a second toning chart and the processor is configured to cause the processor to print a first toning chart before the second toning chart, the first toning chart including a plurality of first toning patches as the plurality of patches and the second toning chart including a plurality of second toning patches as the plurality of patches, and
a second controlling step of causing a processor of the printer to perform
first processing that causes the printer to print the first toning chart including the plurality of first toning patches each having different color values,
second processing that determines the specific color values in accordance with a selection operation of the first toning patches included in the first toning chart,
third processing that obtains the plurality of specific recording material values corresponding to the specific color values in accordance with the plurality of corresponding relationships, fourth processing that causes the printer to print the second toning chart including the second toning patches of the used amounts corresponding to the individual specific recording material values, and fifth processing that receives selection of the second toning patches included in the second toning chart.

* * * * *